H. G. THOMPSON.
SYSTEM OF ELECTRICAL DISTRIBUTION.
APPLICATION FILED OCT. 20, 1909.
1,066,554.
Patented July 8, 1913.
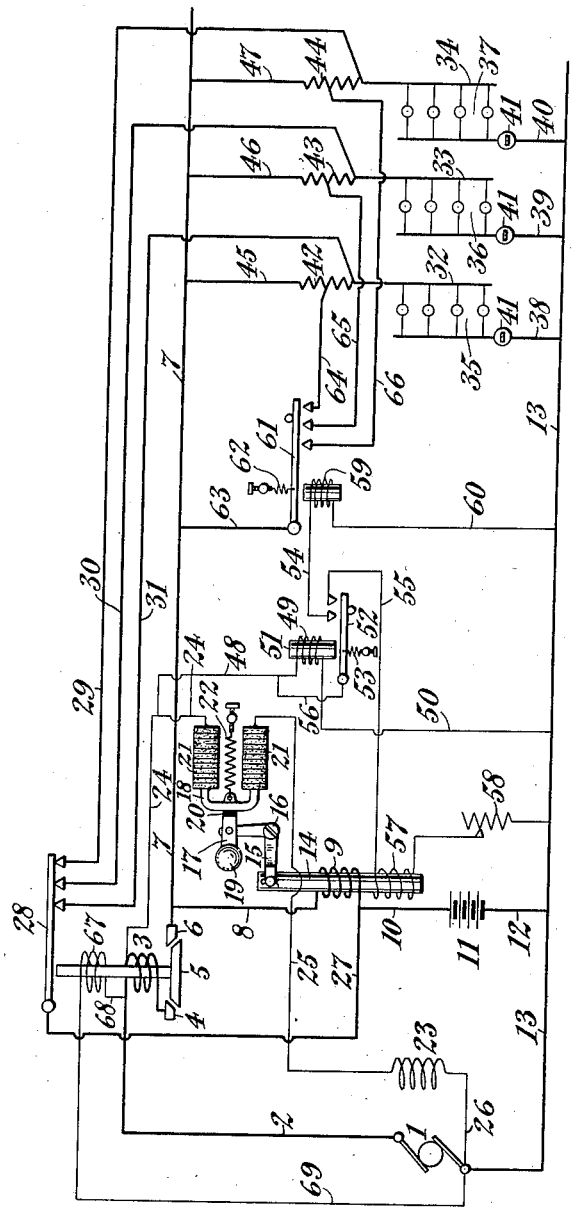
Witnesses:
E. Hall
M. Koskovits
Inventor
Harrison G. Thompson
By his Attorney

UNITED STATES PATENT OFFICE.

HARRISON G. THOMPSON, OF GLEN RIDGE, NEW JERSEY, ASSIGNOR TO THE SAFETY CAR HEATING & LIGHTING COMPANY, A CORPORATION OF NEW JERSEY.

SYSTEM OF ELECTRICAL DISTRIBUTION.

1,066,554.  Specification of Letters Patent.  Patented July 8, 1913.

Application filed October 20, 1909. Serial No. 523,586.

*To all whom it may concern:*

Be it known that I, HARRISON G. THOMPSON, a citizen of the United States, residing in Glen Ridge, county of Essex, and State of New Jersey, have invented new and useful Improvements in Systems of Electrical Distribution, of which the following is a description.

My invention pertains to that class of systems of electrical distribution in which a dynamo driven at variable or intermittent speeds may be used to charge a storage battery and operate lamps or other translating devices.

My invention has for its particular object to provide means whereby a dynamo may be automatically governed to supply a given current to the storage batteries until they have become charged to a predetermined voltage and then automatically decrease the charging current in a predetermined manner. Also means whereby the generator will supply a proper current to the lamps or translating devices irrespective of the current which it is supplying to the battery.

A further object of my invention is to provide means whereby the lamps or translating devices will be operated on a substantially constant potential circuit regardless of variations in voltage of the generator necessary to charge the battery under various conditions.

In the drawing there is shown a diagrammatic representation of one form of system embodying the elements of my invention.

In the said drawing 1 indicates a dynamo or generator from which the lead 2 is carried to the coil 3 terminating in the contact piece 4 of any suitable type of main switch as indicated at 5, from the other terminal 6 of which is led the main 7. From the main 7 the wire 8 is carried to the solenoid coil 9 in connection with the wire 10 leading to the positive side of the storage battery 11, the negative of which communicates with the wire 12 leading to the negative main 13 in connection with the negative brush of the generator. The solenoid coil 9 is provided with a movable core 14 pivotally connected with the bell crank lever 15 supported as by pivot 16 and engaging the member 17 which carries the metallic conducting yoke 18 insulated therefrom as shown at 20 and balanced as by counterweight 19. The yoke 18 is drawn against a pair of carbon resistances 21 as by means of adjustable spring 22, the said resistances 21 being in series with the field 23 of the generator as by means of wires 24, 25 and 26. From the wire 10 the wire 27 is carried to the contact lever 28 adapted when in the position shown in the drawing to cause connection between the wire 27 and the wires 31, 30 and 29 which are carried to the positive lamp mains 32, 33 and 34 respectively which are connected with the positive terminals of the groups of lamps or translating devices indicated by 35, 36 and 37 respectively. Each of these groups of translating devices has its negative terminal connected with its respective translating main 38, 39 and 40 through any type of suitable switch as indicated at 41, the said negative mains being carried to the main 13. The positive translating circuit mains 32, 33 and 34 are also connected with the positive main 7 through resistances 42, 43 and 44 as by means of wires 45, 46 and 47. Wire 48 is carried from the wire 24 to one end of solenoid coil 49, the other end of which is carried to the main 13 as by means of the wire 50. The solenoid coil 49 is provided with the core 51 which when energized will tend to lift the armature 52 against the action of adjustable spring 53 so as to cause connection between said armature and the wires 54 and 55, the armature 52 being connected with the wire 48 as by wire 56. The wire 55 is carried to the coil 57, the other end of which is connected with the main 13 through any suitable type of adjustable resistance 58. The coil 57 is wound in such manner that when energized it will assist the coil 9 in tending to pull the core 14 in a downward direction as will hereinafter more fully appear. The wire 54 is carried to a solenoid coil 59, the other end of which is carried to the main 13 as by means of wire 60 and excitation of the coil 59 tends to draw down the armature 61 against the action of adjustable spring 62 in such manner as to cause the same to connect the wires 64, 65 and 66 with the main 7 through wire 63. The wires 64, 65 and 66 are connected to an intermediate point in the resistances 42, 43 and 44 respectively for a purpose which will hereinafter be more fully explained.

67 represents the closing coil of the switch 5 connected across the generator as by wires 68 and 69.

The practical operation of my improved system of electrical distribution is substantially as follows starting with the generator at rest and the various instrumentalities in their respective positions shown in the drawing: If a group of lamps or translating devices, for example, the group indicated at 35, be thrown on by turning the switch 41, current will flow from the battery through wire 10 to wire 27, lever 28, wire 31 and lamp main 32 to the lamps or translating devices 35 and return through main 38, main 13 and wire 12 to the battery 11. Some current will also pass from wire 10 through coil 9, wire 8, main 7, wire 45 and resistance 42 to the translating main 32 inasmuch as this circuit is in multiple with the above mentioned circuit from the wire 10 to the main 32. The current, however, passing through the circuit containing the coil 9 and resistance 42 will be small compared with that in the other circuit to the lamps or translating devices inasmuch as the resistance of coil 9 and the resistance device 42 are considerable compared with that of the shunt circuit around them. If the group of lamps or translating devices 36 or the group 37 be thrown on current will flow through the translating devices in the same manner as described with reference to the group 35, the resistance devices and connections thereof being represented as identical with those of the group 35. If the generator be started its field will build up in a well-known manner and current will also flow in the coil 67 and tend to close the switch 5 which is so adjusted that the same will close when the voltage upon the generator is that necessary to give the batteries their normal charging current under normal working conditions. This, of course, is considerably above the discharging voltage of the batteries or that voltage at which they have been supplying the lamps as above outlined. When the charging voltage is reached the closing of the switch 5 causes the lever 28 to be raised and connection with the wires 29, 30 and 31 to be broken at the same time that contact is made between the members 4 and 6 and therefore, the current flowing to the lamps or translating devices will all pass through the main 7, wires 45, 46 and 47 and resistances 42, 43 and 44. These resistances are so adjusted as to compensate for the increase in voltage necessary to give the battery its charging current as above mentioned and, therefore, the voltage impressed upon the various groups of lamps is substantially the normal discharge voltage of the battery as before. Current will also flow from the main 7 through wire 8, coil 9 and wire 10 to the battery 11 and return to the generator through wire 12 and main 13. If the generator speed now be increased its voltage will tend to rise and more current will be delivered to the storage battery through the coil 9. This will tend to pull downwardly upon the core 14 and swing the bell crank lever 15 in such manner as to separate the carbons 21 and increase the resistance in the field 23. By proper adjustment of the spring 22 current will be supplied to the battery at a given charging rate for if the current in the coil 9 increase above the desired maximum, the said coil will cause the core 14 to be drawn downward and increase resistance 21 so as to cut down the generator voltage until the normal desired current is flowing in the coil 9 to the battery and thus hold the voltage constant throughout further rises in speed. Current will also flow from the wire 24 through wire 48, coil 49 and wire 50 to the main 13 and if the spring 53 be properly set the core 51 may be caused to raise its armature 52 when the voltage across the generator is equal to that of the storage battery when charged to a desired degree. Therefore, if the battery be charged as above until its voltage has risen to that of the charged voltage the armature 52 will then be automatically lifted and current will flow from wire 48 through wire 56 and armature 52, wire 55, coil 57 and resistance 58 to the main 13. This current flowing in the coil 57, which may be adjusted by proper adjustment of the resistance 58, will assist the coil 9 in pulling down the core 14 and increasing the resistance in the field in such manner that the current now flowing in the coil 9 may be as little as desired and still not suffer any appreciable increase due to increases in speed of the generator, or the resistance 58 may be so adjusted that the coil 57 will cause the resistance 21 to be sufficiently increased that the voltage of the generator will fall below that of the battery when the main switch 5 will open and disconnect the generator from the system. Cutting down the voltage of the generator as above described in order to cut down the charging current would ordinarily cause the lamp voltage to fall therewith but the raising of the armature 52 so as to energize the coil 57 also allows current to flow from the said armature through wire 54, magnet 59 and wire 60 to the main 13. This current draws down the armature 61 against the action of spring 62 and connects wires 64, 65 and 66 with the main 7 through wire 63 in such manner as to short-circuit such portion as desired of the resistances 42, 43 and 44 and thus compensate for this drop which would otherwise take place and thus hold the voltage upon the lamps or translation circuits practically constant or if the adjustment of the resistance 58 be such that the coil 57 will cause the generator to be cut out entirely the opening of the switch 5 will allow the lever 28 to cause connection between wire 27 and wires 29, 30 and 31 so as to short-circuit the entire resistances 42, 43 and 44 as above described when the lamps were supplied by the battery alone. If the generator be supplying current to the line and shall slow down until its voltage decrease the current in coil 9 will lessen and the spring 22 will tend to decrease the resistance in circuit with the field and tend to hold the generator voltage practically constant and if the speed decrease still further until the voltage is reached at which the switch 5 is set to open, the same will open and cut out the generator and simultaneously short-circuit the resistances 42, 43 and 44 by connecting the wires 29, 30 and 31 with the lever 28 in connection with the wire 27. Stopping of the generator will cause the armature 52 to drop and discontinue the current through coil 57 and through coil 59, allowing spring 62 to raise the armature 61 and disconnect wires 64, 65 and 66 and all parts of the system will now be performing the same functions as outlined at the beginning of the above description of their operation.

It will be obvious from the foregoing that I have produced a system of electrical distribution in which the generator may be automatically governed to supply a given charging current to a storage battery until the same shall have become charged to a desired voltage and then automatically reduce the charge to any desired amount. Also that I have produced a system in which the current supplied to the storage battery is independent of that supplied to the lamps by the generator and in which the voltage upon the lamps or translation devices is held practically constant regardless of the voltage necessarily carried across the generator to give the storage battery the various charging currents that may be desired, particularly in a system in which the lamps or translating devices are divided into groups or circuits adapted to be thrown off or on as units and not have the load of any individual circuit changed to any appreciable extent, usual conditions to be met in the art of electrical car lighting.

I do not wish in any way to limit myself to any of the constructions or exact details illustrated in the accompanying drawing which is a mere diagram intended to indicate one type of system of electrical distribution embodying my invention and it is obvious that wide departure may be made both in detail of construction and mode of operation without departing from the scope of my invention.

Having thus described my invention what I consider novel and desire to protect by Letters Patent is as set forth in the following claims:

1. A system of electrical distribution comprehending a generator, a storage battery and a work circuit, of a regulator for the generator responsive only to the action of current flowing into the storage battery and means whereby the voltage across the battery alters the effect of said current to the battery upon said regulator.

2. A system of electrical distribution comprehending a generator, an automatic switch controlling the main circuit thereof, a storage battery, a regulator for the generator having a coil in a series circuit with said storage battery and adapted to be opened only at the switch contacts and a plurality of translation circuits having predetermined resistances in series therewith, combined with a means whereby the opening of said automatic switch causes a shunt circuit to be established around said resistances and said series coil.

3. A system of electrical distribution comprehending a generator, an automatic switch controlling the main circuit thereof, a storage battery, a regulator for the generator having a coil in a series circuit with said storage battery and adapted to be opened only at the switch contacts and a plurality of translation circuits having predetermined resistances in series therewith, combined with a common means whereby the opening of said automatic switch causes a shunt circuit to be established around said resistances and around the coil of the regulator in series with the battery.

4. A system of electrical distribution comprehending a generator, an automatic switch controlling the main circuit thereof, a storage battery, a regulator for the generator having a coil in a series circuit with said storage battery and adapted to be opened only at the switch contacts and a plurality of translation circuits having predetermined resistances in series therewith, combined with common means whereby the opening of said automatic switch causes shunt circuits to be established around said resistances and said coil and said shunt circuits to be automatically broken by the closing of said switch.

5. A system of electrical distribution comprehending a generator, an automatic switch controlling the main circuit thereof, a storage battery, a regulator for the generator having a coil in a series circuit with said storage battery and adapted to be opened only at the switch contacts and a plurality of translation circuits having predetermined resistances in series therewith, combined with common means whereby the opening of said automatic switch causes a shunt circuit to be established around said resistances and around the coil of the regulator in series with the generator and said shunt circuits to be automatically broken by the closing of said switch.

6. A system of electrical distribution comprehending a generator, a regulator therefor, a storage battery and a work circuit, a plurality of translation circuits across the work circuit through resistances, combined with means whereby said regulator decreases the current to the storage battery when a certain charging voltage is reached and automatic means for decreasing said resistances when the generator voltage is so decreased and means whereby further decrease in generator voltage causes a further decrease of resistance in said translation circuits.

7. A system of electrical distribution comprehending a generator, a regulator therefor, a storage battery and a work circuit, a plurality of translation circuits across the work circuit through resistances, combined with means whereby said regulator decreases the current to the storage battery when a certain charging voltage is reached and automatic means for decreasing said resistances when the generator voltage is so decreased and means whereby decrease in generator voltage causes a further decrease of resistance in said translation circuits and short circuits the operating means of said regulator.

8. A system of electrical distribution comprehending a generator, a storage battery and a plurality of translating devices operatively connected therewith through resistances, a regulator for the generator having a coil in series with the storage battery, a coil coöperating therewith in shunt to the storage battery and means for manipulating the circuit of said coil and varying the said resistances.

9. A system of electrical distribution comprehending a generator, a storage battery and a plurality of translating devices operatively connected therewith through resistances, a regulator for the generator having a coil in series with the storage battery, a coil coöperating therewith in shunt to the storage battery, means for manipulating the circuit of said coil and varying the said resistance and means whereby fall in generator voltage below that of the battery further affects the said resistances.

HARRISON G. THOMPSON.

Witnesses:
JOHN T. CLARK,
E. E. ALLBEE.